(12) United States Patent
Watanabe et al.

(10) Patent No.: US 11,410,216 B2
(45) Date of Patent: Aug. 9, 2022

(54) CUSTOMER SERVICE ASSISTANCE APPARATUS, CUSTOMER SERVICE ASSISTANCE METHOD, AND COMPUTER-READABLE RECORDING MEDIUM

(71) Applicant: NEC CORPORATION, Tokyo (JP)

(72) Inventors: Junko Watanabe, Tokyo (JP); Hiromi Yamaguchi, Tokyo (JP); Shinji Nakadai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/762,370

(22) PCT Filed: Nov. 6, 2018

(86) PCT No.: PCT/JP2018/041087
§ 371 (c)(1),
(2) Date: May 7, 2020

(87) PCT Pub. No.: WO2019/093292
PCT Pub. Date: May 16, 2019

(65) Prior Publication Data
US 2020/0357032 A1 Nov. 12, 2020

(30) Foreign Application Priority Data
Nov. 7, 2017 (JP) .............................. JP2017-215057

(51) Int. Cl.
*G06Q 30/00* (2012.01)
*G06Q 30/06* (2012.01)
(Continued)

(52) U.S. Cl.
CPC ....... *G06Q 30/0613* (2013.01); *G06F 16/248* (2019.01); *G06F 16/2455* (2019.01); *G06Q 30/0631* (2013.01)

(58) Field of Classification Search
None
See application file for complete search history.

(56) References Cited

U.S. PATENT DOCUMENTS 10,824,804 B2 * 11/2020 Jang ..................... G06F 40/247
2014/0337151 A1 * 11/2014 Crutchfield ........... G06F 1/1601
705/17
(Continued)

FOREIGN PATENT DOCUMENTS

JP  2015-219784 A  12/2015
JP  2017-004432 A  1/2017
(Continued)

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — Sughrue Mion, PLLC

(57) ABSTRACT

A customer service assistance apparatus 10 is provided with a video image acquisition unit 11 that acquires a video image of the inside of a store, a specifying unit 12 that specifies a product that a customer in the store is interested in and attributes of the customer based on the acquired video image, an information acquisition unit 13 that searches a specific database using the specified product and attributes as queries, and acquires content corresponding to the product and attributes that serve as queries, and the transmission unit 14 that transmits the acquired content to a terminal apparatus that is used by a store salesperson of the store.

12 Claims, 9 Drawing Sheets

(51) Int. Cl.
*G06F 16/2455* (2019.01)
*G06F 16/248* (2019.01)

(56) References Cited

U.S. PATENT DOCUMENTS

| | | | | |
|---|---|---|---|---|
| 2014/0365334 | A1* | 12/2014 | Hurewitz | G06Q 30/0613 |
| | | | | 705/26.41 |
| 2015/0026010 | A1* | 1/2015 | Ellison | G06Q 30/0613 |
| | | | | 705/26.41 |
| 2015/0052013 | A1* | 2/2015 | Anttonen | G06Q 30/0613 |
| | | | | 705/26.41 |
| 2016/0203499 | A1* | 7/2016 | Yamashita | G06Q 30/0201 |
| | | | | 705/7.29 |
| 2017/0053330 | A1* | 2/2017 | Smith | H04W 4/021 |
| 2019/0114689 | A1* | 4/2019 | Wang | G06Q 30/0224 |

FOREIGN PATENT DOCUMENTS

| | | |
|---|---|---|
| JP | 2017-083980 A | 5/2017 |
| JP | 2017-102574 A | 6/2017 |
| WO | 2015/033577 A1 | 3/2015 |
| WO | 2017/056433 A1 | 4/2017 |

OTHER PUBLICATIONS wiki.gis.com; "Location-based service"; Feb. 18, 2011; wiki.gis.com (Year: 2011).*

Hyunwoo Hwangbo et al; "Use of the Smart Store for Persuasive Marketing and Immersive Customer Experiences: A Case Study of Korean Apparel Enterprise"; Mar. 5, 2017; Hindawi Mobile Information Systems vol. 2017, Article ID 4738340 (Year: 2017).*

International Preliminary Report on Patentability with English translation of the Written Opinion of the International Searching Authority dated May 22, 2020, in International Application No. PCT/JP2018/041087.

International Search Report for PCT/JP2018/041087, dated Jan. 15, 2019.

* cited by examiner

CUSTOMER SERVICE ASSISTANCE APPARATUS, CUSTOMER SERVICE ASSISTANCE METHOD, AND COMPUTER-READABLE RECORDING MEDIUM

CROSS REFERENCE TO RELATED APPLICATIONS

This application is a National Stage of International Application No. PCT/JP2018/041087 filed Nov. 6, 2018, claiming priority based on Japanese Patent Application No. 2017-215057 filed Nov. 7, 2017, the disclosure of which is incorporated herein in its entirety by reference.

TECHNICAL FIELD

The present invention relates to a customer service assistance apparatus and a customer service assistance method for assisting a store salesperson in a store in serving a customer, and in particular relates to a computer-readable recording medium in which programs for realizing these are recorded.

BACKGROUND ART

In recent years, due to developments in IT (Information Technology), various systems for assisting a store salesperson in serving a customer in a retail store have been proposed (for example, see Patent Documents 1 to 3). According to such systems, a store salesperson can efficiently serve a customer compared with a conventional system.

Patent Document 1 discloses a system for transmitting information regarding a customer's taste to a terminal apparatus of a store salesperson. Specifically, when a customer enters a store, the system disclosed in Patent Document 1 specifies the customer based on an image of the customer entering the store, and extracts taste information of the specified customer (for example, attribute information and purchase history of the customer) from a database. The system disclosed in Patent Document 1 then transmits the extracted taste information to a terminal apparatus of a store salesperson, and presents the extracted taste information on the screen of the terminal apparatus. According to the system disclosed in Patent Document 1, the store salesperson can be aware of the customer's tastes, and thus can efficiently serve the customer.

In addition, Patent Document 2 discloses a system for distributing product-related content to a customer's terminal and a store salesperson's terminal. Specifically, the system disclosed in Patent Document 2 transmits content related to a recommended product (a catalog of products, etc.), to a customer's terminal, and transmits a reason for recommending the product to the customer, to a store salesperson's terminal.

For example, assume that the system disclosed in Patent Document 2 has distributed content "XXX bag XXX series of brand XXX" to a customer's terminal. In this case, the system disclosed in Patent Document 2 transmits, to a store salesperson's terminal, a message "XXX is a brand that is highly popular among married ladies in their forties, and is a customer's favorite brand. XXX bag XXX series is a highly popular item. This customer purchases about two bags a year, and it is about time for this customer to purchase a new one", for example.

When such a message is received by the terminal and is displayed on the screen of the terminal, the store salesperson checks the message. As a result, the store salesperson can confirm a specific reason for recommending the product to the customer, and thus, can efficiently serve the customer in this case as well.

Furthermore, Patent Document 3 discloses a system for analyzing a customer's movement. Specifically, the system disclosed in Patent Document 3 first acquires image information and distance information output from a 3D camera for shooting an image of a product shelf and a customer positioned in front of the product shelf. The system disclosed in Patent Document 3 then specifies a product that is held in a hand of a customer based on the acquired information, and analyzes a customer's movement toward the product based on the ID of the specified product, the position thereof at the point in time (the position of the shelf where the product was located), the time, and the like.

According to information obtained through this analysis, the store can be aware of which shelf and which row in the shelf a product that is frequently touched by customers is located in, and thus can achieve better shelf allocation. In addition, by using this information, the store can specify a change in customers' movement before and after distribution of flyers and before and after an advertisement, and, thus can also understand effects of distribution of flyers and an advertisement. Therefore, also with the use of the system disclosed in Patent Document 3, a store salesperson can efficiently serve a customer.

LIST OP RELATED ART DOCUMENTS

Patent Document

Patent Document 1: Japanese Patent Laid-Open Publication No. 2017-04432
Patent Document 2: Japanese Patent Laid-Open Publication No. 2015-219784
Patent Document 3: International Publication WO2015/033577

SUMMARY OF INVENTION

Problems to be Solved by the Invention

Incidentally, the most important thing in customer service is to make a customer in a store be "willing to buy" in other words "motivated to purchase" a product in which the customer is currently showing an interest in actuality. Therefore, there is demand for a system that assists in customer service to suggest, as customer service assistance, what a store salesperson needs to say in order to motivate a customer to purchase a product.

However, the system disclosed in Patent Document 1 only presents information regarding a customer's taste to a store salesperson, and what the store salesperson to which the customer's taste information is presented needs to say to the customer using the taste information is left to the discretion of the store salesperson. In other words, the system disclosed in Patent Document 1 does not suggest what a store salesperson needs to say in order to motivate a customer to purchase a product. Therefore, it is difficult for the system disclosed in Patent Document 1 to sufficiently assist a store salesperson inexperienced in customer service, in particular.

In addition, taste information extracted and presented by the system disclosed in Patent Document 1 is information that is based on a customer's past purchase history. Therefore, if a customer enters a store to purchase a product of a different type from one that the customer has purchased in the past, there is the possibility that a store salesperson will end up saying something inappropriate due to such taste information.

In addition, the system disclosed in Patent Document 2 transmits content related to a recommended product, to a customer's terminal, and transmits a reason for recommending the product to the customer, to a store salesperson's terminal. However, if the customer does not show interest in the recommended product, it is difficult to motivate the customer to purchase the product using the system disclosed in Patent Document 2.

In addition, the system disclosed in Patent Document 3 only has a function of analyzing a customer's movement, and an analyzer needs to determine, based on the analysis result, what a store salesperson should say in order to motivate the customer to purchase a product.

An example object of the invention is to provide a customer service assistance apparatus, a customer service assistance method, and a computer-readable recording medium that make it possible to solve the above problems, and to suggest what a store salesperson needs to say in order to motivate a customer to purchase a product.

Means for Solving the Problems

In order to achieve the above-described example purpose, a customer service assistance apparatus according to an example aspect of the invention includes:

a video image acquisition unit configured to acquire a video image of the inside of a store;

a specifying unit configured to specify a product that a customer in the store is interested in and an attribute of the customer, based on the acquired video image;

an information acquisition unit configured to execute a search using the specified product and attribute as queries, and acquire content corresponding to the product and attribute that serve as the queries; and a transmission unit configured to transmit the acquired content to a terminal apparatus that is used by a store salesperson of the store.

In addition, in order to achieve the above-described example purpose, a customer service assistance method according to an example aspect of the invention includes:

(a) a step of acquiring a video image of the inside of a store;

(b) a step of specifying a product that a customer in the store is interested in and an attribute of the customer, based on the acquired video image;

(c) a step of executing a search using the specified product and attribute as queries, and acquiring content corresponding to the product and attribute that serve as the queries; and (d) a step of transmitting the acquired content to a terminal apparatus that is used by a store salesperson of the store.

Furthermore, in order to achieve the above-described example purpose, a computer-readable recording medium according to an example aspect of the invention includes a program recorded thereon, the program including instructions that cause a computer to carry out:

(a) a step of acquiring a video image of the inside of a store;

(b) a step of specifying a product that a customer in the store is interested in and an attribute of the customer, based on the acquired video image;

(c) a step of executing a search using the specified product and attribute as queries, and acquiring content corresponding to the product and attribute that serve as the queries; and (d) a step of transmitting the acquired content to a terminal apparatus that is used by a store salesperson of the store.

Advantageous Effects of the Invention

As described above, according to the invention, it is possible to suggest what a store salesperson needs to say in order to motivate a customer to purchase a product.

EXAMPLE EMBODIMENT

First Example Embodiment

A customer service assistance apparatus, a customer service assistance method, and a program in a first example embodiment of the invention will be described below with reference to FIGS. 1 to 6.

[Apparatus Configuration]

Figure 1:
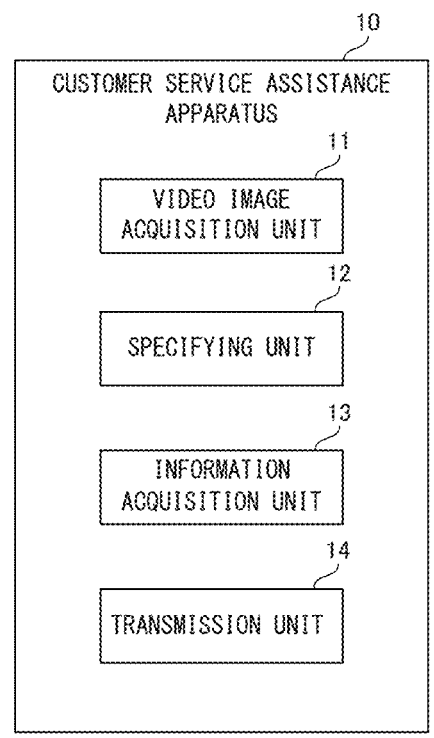
FIG. 1 is a block diagram illustrating a schematic configuration of a customer service assistance apparatus according to a first example embodiment of the invention.

First, a schematic configuration of the customer service assistance apparatus in this first example embodiment will be described with reference to FIG. 1. FIG. 1 is a block diagram illustrating a schematic configuration of the customer service assistance apparatus in the first example embodiment of the invention.

A customer service assistance apparatus 10 according to this first example embodiment illustrated in FIG. 1 is an apparatus for assisting a store salesperson in serving a customer in a store. As illustrated in FIG. 1, the customer service assistance apparatus 10 according to this first example embodiment is provided with a video image acquisition unit 11, a specifying unit 12, an information acquisition unit 13, and a transmission unit 14.

The video image acquisition unit 11 acquires a video image of the inside of a store. The specifying unit 12 specifies a product that a customer in the store is interested in and attributes of the customer, based on the video image acquired by the video image acquisition unit 11. The information acquisition unit 13 executes a search using, as queries, the product and attributes specified by the specifying unit 12, and acquires content corresponding to the product and attributes that serve as queries. The transmission unit 14 transmits the content acquired by the information acquisition unit 13, to a terminal apparatus that is used by a store salesperson of the store.

As described above, in this first example embodiment, when an image of a customer that is interested in a certain product is shot, content related to the customer and the product is retrieved, and the retrieved content is transmitted to a terminal apparatus of a store salesperson. Therefore, the store salesperson can lively talk about the product by having a conversation with the customer based on such content, and, as a result, can motivate the customer to purchase the product. In other words, according to the customer service assistance apparatus 10 in this first example embodiment, what the store salesperson needs to say in order to motivate the customer to purchase the product is suggested.

Figure 2:
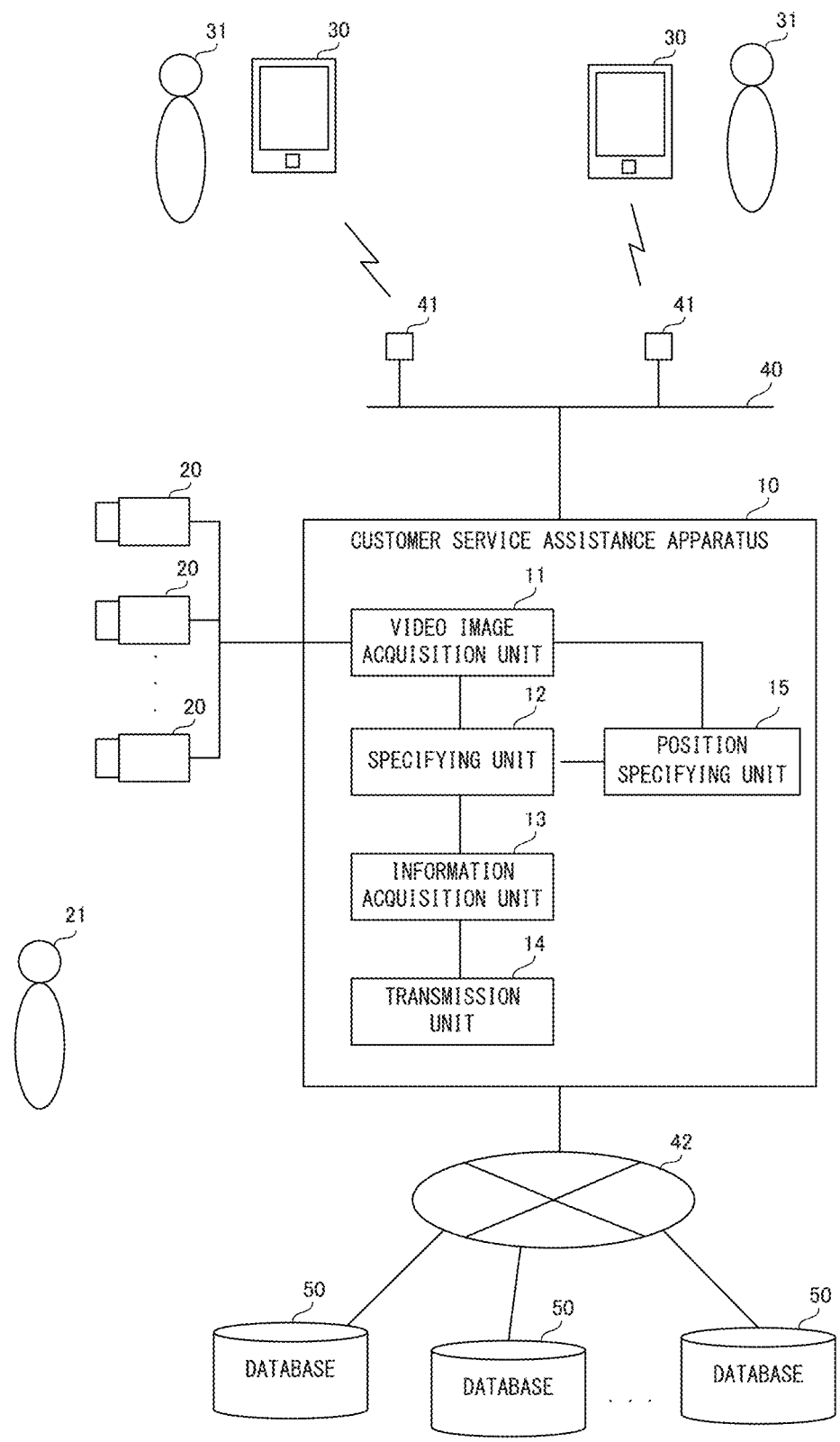
FIG. 2 is a block diagram illustrating a configuration of the customer service assistance apparatus according to the first example embodiment of the invention in detail.
Figure 3:
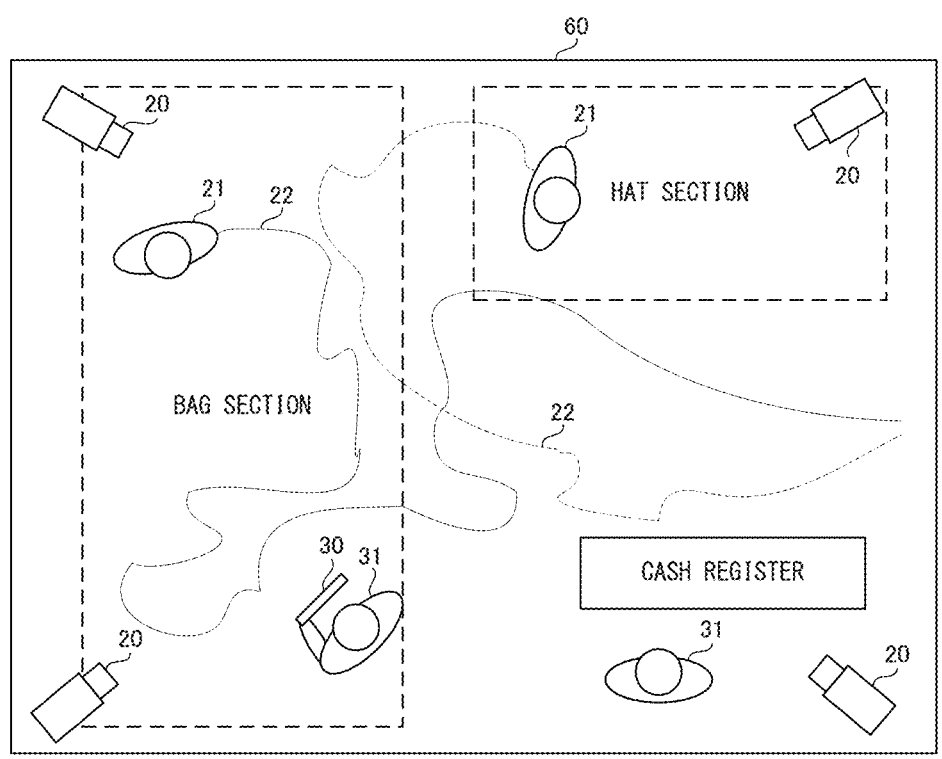
FIG. 3 is a layout diagram illustrating an example of layout of a store in which a customer is served according to the first example embodiment of the invention.
Figure 4:
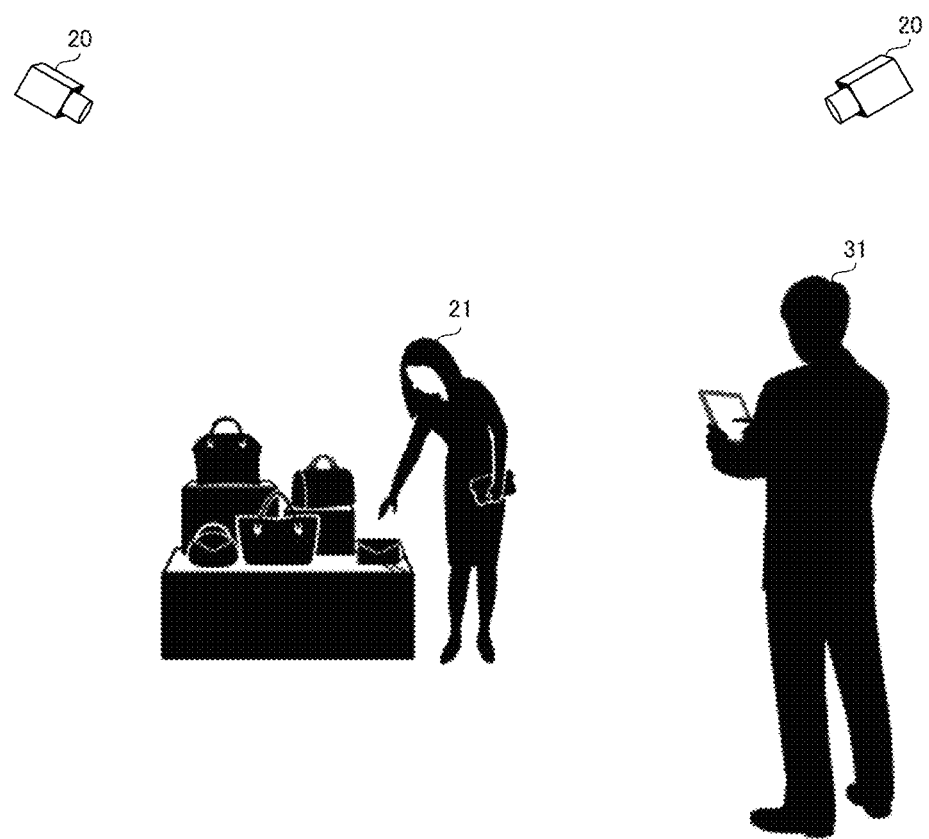
FIG. 4 is an explanatory diagram illustrating an example of a state of a store salesperson that is assisted by the customer service assistance apparatus according to the first example embodiment of the invention to serve a customer.
Figure 5:
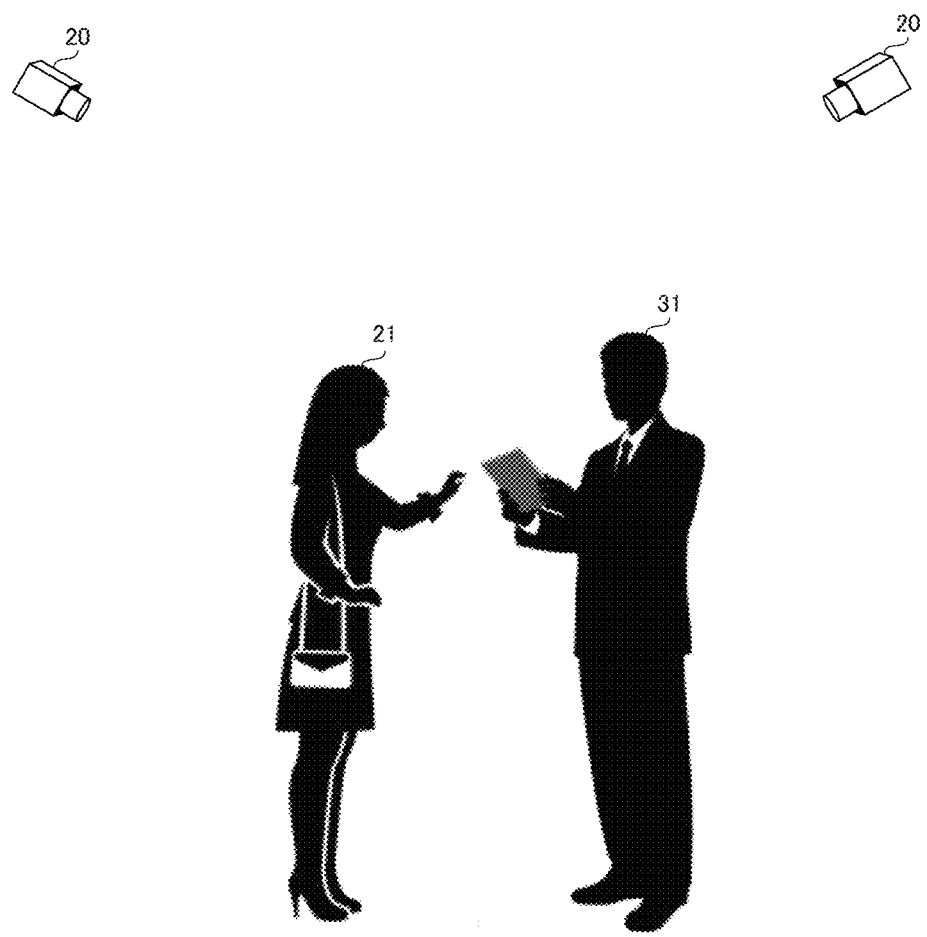
FIG. 5 is an explanatory diagram illustrating another example of a state of a store salesperson that is assisted by the customer service assistance apparatus according to the first example embodiment of the invention to serve a customer.

Next, the configuration of the customer service assistance apparatus 10 according to this first example embodiment will be described in more detail with reference to FIGS. 2 to 5. FIG. 2 is a block diagram illustrating the configuration of the customer service assistance apparatus according to the first example embodiment of the invention in detail. FIG. 3 is a layout diagram illustrating an example of the layout of a store in which a customer is served according to the first example embodiment of the invention. FIG. 4 is an explanatory diagram illustrating an example of a state of a store salesperson that is assisted by the customer service assistance apparatus according to the first example embodiment of the invention in serving a customer FIG. 5 is an explanatory diagram illustrating another example of a state of a store salesperson that is assisted by the customer service assistance apparatus according to the first example embodiment of the invention in serving a customer.

First, as illustrated in FIGS. 2 to 4, a plurality of cameras 20 are installed inside a store 60. Each of the cameras 20 shoots an image of a corresponding region in the store 60, and outputs video image data of the shot region.

In addition, as illustrated in FIG. 2, in this first example embodiment, the customer service assistance apparatus 10 is connected to the plurality of cameras 20, and the video image acquisition unit 11 acquires video image data output from each of the plurality of cameras 20.

Furthermore, the customer service assistance apparatus 10 is connected to a terminal apparatus 30 that is used by a store salesperson 31 of the store 60 via a LAN (Local Area Network) 40, to enable data communication. Reference numeral 41 denotes a wireless access port provided for the LAN 40. In addition, the customer service assistance apparatus 10 is also connected to various databases 50 on the Web via internet 42. Examples of the databases 50 include a database of a Web server that provides a Web site, and a database that stores statistic data such as climate data publicized on the Web.

Furthermore, as illustrated in FIG. 2, in this first example embodiment, the customer service assistance apparatus 10 is also provided with a position specifying unit 15 in addition to the video image acquisition unit 11, the specifying unit 12, the information acquisition unit 13, and the transmission unit 14 that have been described above.

The position specifying unit 15 first acquires, from the terminal apparatus 30 that is used by the store salesperson 31 of the store 60, positional information for specifying the position of the terminal apparatus 30, and specifies the position of the store salesperson 31 based on the acquired positional information. Moreover, the position specifying unit 15 specifies the position of a customer 21 based on a video image acquired by the video image acquisition unit 11. The position specifying unit 15 then notifies the specifying unit 12 of the specified positions of the store salesperson 31 and the customer 21.

Specifically, if provided with a GPS receiver, the terminal apparatus 30 creates positional information based on a received GPS signal. Also, if connected to the wireless LAN of the store 60, the terminal apparatus 30 creates positional information based on the position of an access point of the wireless LAN to which the terminal apparatus 30 is connected. The position specifying unit 15 acquires positional information created in this manner, from the terminal apparatus 30, and specifies the position of the store salesperson 31 that holds this terminal apparatus 30.

In addition, when a customer appears in video image data acquired by one of the cameras 20, the position specifying unit 15 extracts feature amounts of the customer, and tracks the customer based on the extracted feature amounts. At this time, when the customer moves out of frame from video image data of one camera, the position specifying unit 15 detects the feature amounts from video image data of another camera, and continues to track the customer 21. The position specifying unit 15 then specifies the position of the customer 21 in the store 60 that is being tracked, based on installation positions and shooting directions of cameras registered in advance, and the position of the customer in the screen. Also, the position specifying unit 15 can also create flow line information for specifying a moving path 22 of the customer 21 by recording specified positions of the customer 21 in time series as illustrated in FIG. 3.

In addition, in this embodiment, the position specifying unit 15 can also specify the position of the store salesperson 31 based on video image data acquired by a camera 20, similarly to the position of the customer 21. Specifically, the position specifying unit 15 detects and tracks the store salesperson 31 by comparing feature amounts extracted from video image data with feature amounts indicating the store salesperson 31 and prepared in advance. The position specifying unit 15 then specifies the position of the store salesperson 31 in the store 60 that is being tracked, based on installation positions and shooting directions of cameras registered in advance, and the position of the store salesperson 31 on the screen.

In addition, in this first example embodiment, if the relationship between the position of the customer 21 and the position of the store salesperson 31 satisfies a set condition, the specifying unit 12 specifies a product that the customer 21 is interested in and the attributes of the customer 21. Examples of the set condition include the distance between the customer 21 and the store salesperson 31 being shorter than or equal to a threshold. In addition, if the above-mentioned flow line information is created, the specifying unit 12 measures, using the flow line information, the number of times the customer 21 has approximated the store salesperson 31 to a certain distance, and can also specify a product that the customer 21 is interested in and the attributes of the customer 21, using, as a set condition, the measured number of times being larger than or equal to a threshold.

In addition, in this first example embodiment, the specifying unit 12 specifies a product that the customer 21 is interested in, by using an existing image processing technique. Specifically, the specifying unit 12 first detects an image of the face or a hand of the customer 21 based on video image data, and further detects, based on the detected image, an image of a product to which the face is directed, or an image of a product that is in contact with the hand. The specifying unit 12 then collates feature amounts of the detected image with a table in which a feature amount is registered for each piece of identification information of the product (a name, a model number, a shape, a color, etc), and specifies the identification information of the product that the customer 21 is interested in.

Furthermore, the specifying unit 12 can also specify the attributes of the customer 21 appearing in a video image, such as their age and gender by using an existing image processing technique. Specifically, the specifying unit 12 extracts feature amounts of the customer 21, and then compares the extracted feature amounts with feature amounts registered for the respective attributes in advance so as to specify the attributes of the customer 21.

In this first example embodiment, the information acquisition unit 13 searches a specific database using text indicating identification information of a specified product (name, model number, shape, color, etc.) and text indicating the attributes of a customer as queries. Also, at this time, the information acquisition unit 13 may also perform a search using a search engine provided therein, or may also perform a search using a search engine on the Web.

In addition, the information acquisition unit 13 can select a database according to a specified attribute, and search the selected database. For example, if the customer 21 is in their twenties, the information acquisition unit 13 selects a database of a moving image site, and if the customer 21 is in their fifties or older, selects a database of a news site.

The information acquisition unit 13 then acquires retrieved content. The information acquisition unit 13 also acquires data of the content itself or a URL of the content. The information acquisition unit 13 then transmits the acquired content to the transmission unit 14. Specifically, the content may be information related to a product that a customer is interested in, such as information of a newspaper article, a newspaper advertisement, a magazine article, a magazine advertisement, a television program, a television commercial, a Web article, or Web advertisement.

The transmission unit 14 transmits the received content to the terminal apparatus 30 of the store salesperson 31. Accordingly, as illustrated in FIG. 4, the store salesperson 31 can check the content on the screen of the terminal apparatus 30. As illustrated in FIG. 5, the store salesperson 31 can then serve the customer 21 while showing the displayed content to the customer 21.

As described above, according to this first example embodiment, the information acquisition unit 13 can acquire content that the customer 21 has probably looked at or is expected to look at, by performing a search. Such content is then displayed on the screen of the terminal apparatus 30, and thus the store salesperson 31 can have a lively conversation with the customer 21 based on the displayed content.

[Apparatus Operations]

Figure 6:
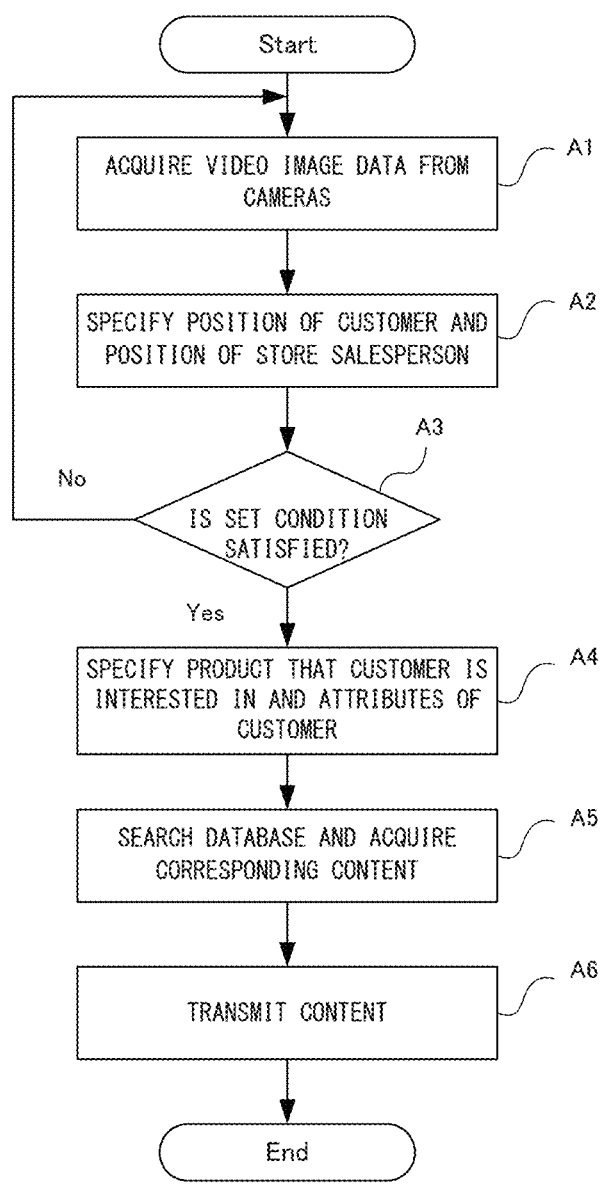
FIG. 6 is a flowchart illustrating operations of the customer service assistance apparatus according to the first example embodiment of the invention.

Next, operations of the customer service assistance apparatus 10 according to this first example embodiment will be described with reference to FIG. 6. FIG. 6 is a flowchart illustrating operations of the customer service assistance apparatus according to the first example embodiment of the invention. In the following description, FIGS. 1 to 4 will be referred to as appropriate. In addition, in this first example embodiment, a customer service assistance method is implemented by causing the customer service assistance apparatus 10 to operate. Therefore, description of the customer service assistance method according to this first example embodiment is replaced with the following description of operations of the customer service assistance apparatus 10.

As illustrated in FIG. 6, first, the video image acquisition unit 11 acquires a video image from each of the cameras 20 (step A1). Specifically, in step A1, the video image acquisition unit 11 acquires frames that make up video image data, from each of the cameras. The number of frames that are acquired at this time may be one, or two or more.

Next, the position specifying unit 15 specifies the position of the customer 21 and the position of the store salesperson 31 in the store 60 (step A2). Specifically, in step A2, the position specifying unit 15 specifies the position of the store salesperson 31 based on positional information acquired from the terminal apparatus 30. Also, the position specifying unit 15 specifies the position of the customer 21 based on the video image acquired in step A1.

Next, the specifying unit 12 determines whether or not the relationship between the position of the customer 21 and the position of the store salesperson 31 specified in step A2 satisfies a set condition (step A3). Specifically, in step A3, the specifying unit 12 determines whether or not the distance between the customer 21 and the store salesperson 31 is shorter than or equal to a threshold, for example.

As a result of the determination in step A3, if the set condition is not satisfied, step A1 is executed again by the video image acquisition unit 11. On the other hand, as a result of the determination in step A3, if the set condition is satisfied, the specifying unit 12 specifies a product that the customer 21 located in the store 60 is interested in and attributes of the customer 21 (step A4).

Specifically, in step A4, the specifying unit 12 detects an image of the face or a hand of the customer in the video image data, and further detects an image of the product that the customer 21 is interested in, based on the detected image. The specifying unit 12 then obtains feature amounts from the detected image, and collates the obtained feature amounts with a table in which feature amounts are registered for the respective pieces of identification information of the product (a name, a model number, a shape, a color, etc.), and specifies identification information of the product that the customer 21 is interested in. In addition, the specifying unit 12 extracts feature amounts of the customer 21, and then compares the extracted feature amounts with feature amounts registered for respective attributes in advance, and specifies the attributes of the customer 21.

Next, the information acquisition unit 13 searches a specific database using the product and attributes specified in step A4 as queries, and thereby acquires content corresponding to the product and attributes that serve as queries (step A5). In addition, the information acquisition unit 13 passes the acquired content to the transmission unit 14.

Next, the transmission unit 14 transmits the content acquired in step A5, to the terminal apparatus 30 of the store salesperson 31 (step A6). Accordingly, as illustrated in FIGS. 4 and 5, the store salesperson 31 can check the content on the screen of the terminal apparatus 30, and can have a conversation with the customer based on this content.

Effects of First Example Embodiment

As described above, according to this first example embodiment, the store salesperson 31 can have a lively conversation with a customer, based on content displayed on the screen of the terminal apparatus 30, and thus can easily motivate the customer to purchase a product. In particular, according to this first example embodiment, it is possible to help a customer that cannot decide whether or not to purchase a product that the customer is interested in, to make up their mind. In addition, the content is automatically transmitted to the terminal apparatus 30 of the store salesperson 31 according to the positional relation between the store salesperson 31 and the customer 21, and thus the store salesperson can efficiently serve the customer.

[Program]

A program in this first example embodiment may be any program that causes a computer to execute steps A1 to A6 illustrated in FIG. 6. By installing this program in a computer, and executing this program, the customer service assistance apparatus 10 and the customer service assistance method in this first example embodiment can be realized. In this case, a processor of the computer functions as the video image acquisition unit 11L the specifying unit 12, the information acquisition unit 13, the transmission unit 14, and the position specifying unit 15, and performs processing.

In addition, the program in this first example embodiment may be executed by a computer system constituted by a plurality of computers. In this case, for example, each of the computers may function as one of the video image acquisition unit 11, the specifying unit 12, the information acquisition unit 13, the transmission unit 14, and the position specifying unit 15.

Modified Example

In this first example embodiment, a configuration can be adopted in which the customer service assistance apparatus 10 detects a serving state as illustrated in FIGS. 4 and 5, and, until the detected serving state is cancelled, the customer service assistance apparatus 10 does not transmit new content to the terminal apparatus 30 that is in the serving state. For example, assume that, in a crowded store, when the store salesperson and a customer A are looking at content, another customer B passes nearby. According to this example aspect, control is performed so as to prevent content for the customer B from being displayed on the screen of the terminal apparatus 30 in this case.

In addition, in the above example aspect, the customer service assistance apparatus 10 can detect a serving state, for example, by receiving a notification that the salesperson is in a serving state, from the terminal apparatus 30. Furthermore, notification may be performed according to an operation that is performed by the store salesperson 31 (pressing a physical button or a soft key, for example), or may also be automatically performed by the terminal apparatus 30 based on an image obtained by a front camera.

Second Example Embodiment

Next, a customer service assistance apparatus, a customer service assistance method, and a program according to a second example embodiment of the invention will be described with reference to FIGS. 7 and 8.

[Apparatus Configuration]

First, a configuration of the customer service assistance apparatus according to this second example embodiment will be described with reference to FIG. 7. FIG. 7 is a block diagram illustrating the configuration of the customer service assistance apparatus according to the second example embodiment of the invention in detail.

Figure 7:
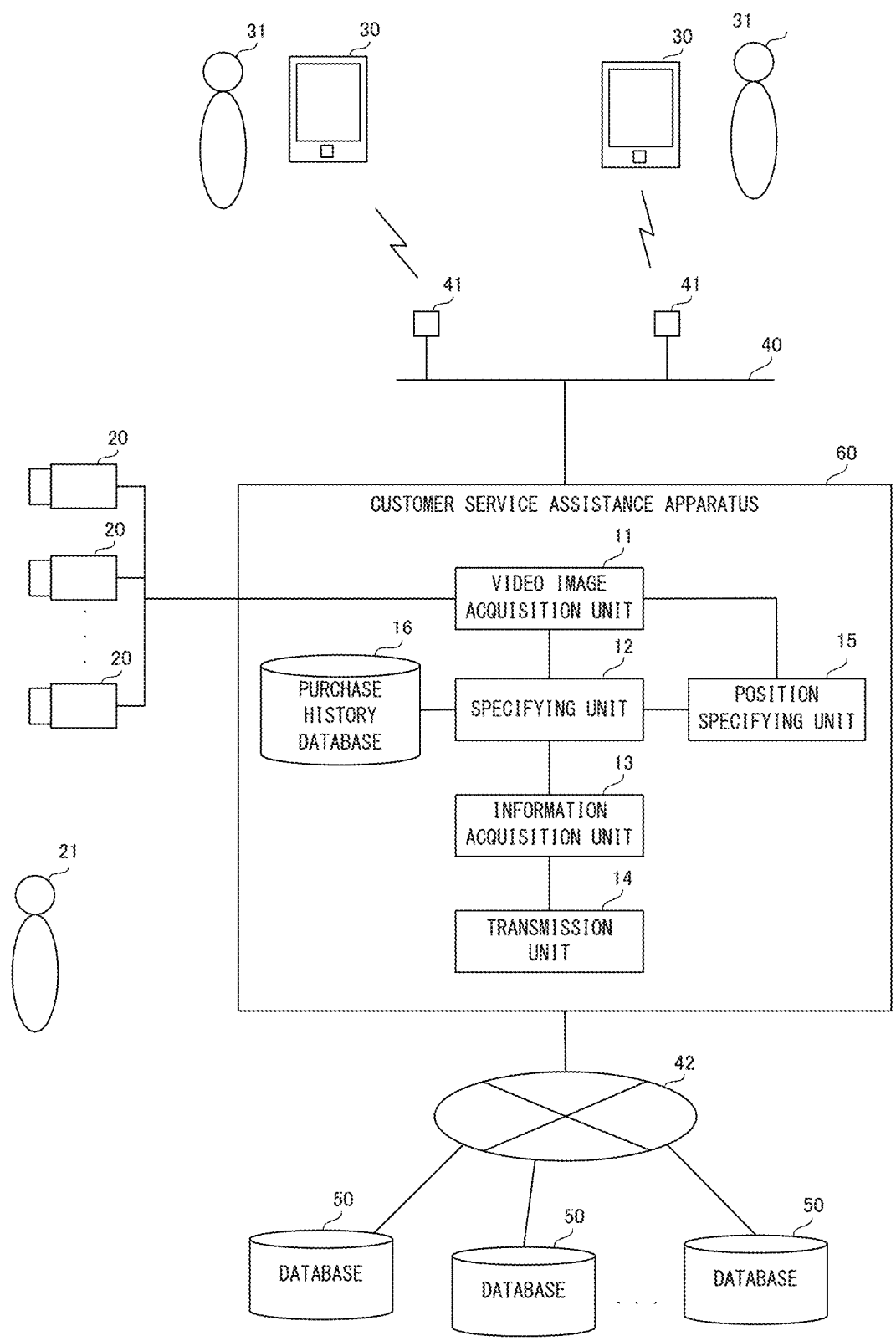
FIG. 7 is a block diagram illustrating a configuration of a customer service assistance apparatus according to a second example embodiment of the invention in detail.

As illustrated in FIG. 7, a customer service assistance apparatus 70 according to this second example embodiment is different from the customer service assistance apparatus 10 according to the first example embodiment with regard to functions of the specifying unit 12 and the information acquisition unit 13. The differences will be mainly described below.

As illustrated in FIG. 7, in this second example embodiment, the customer service assistance apparatus 70 is provided with a purchase history database 16 in addition to the video image acquisition unit 11, the specifying unit 12, the information acquisition unit 13, the transmission unit 14, and the position specifying unit 15 described in the first example embodiment. The purchase history database 16 stores identification information of the customer 21 and the past purchase history of the customer 21 in association with each other. Note that a purchase history, which is customer's personal information, is used only when permitted by the customer 21.

In addition, in this second example embodiment, the specifying unit 12 specifies a product that the customer 21 is interested in and attributes of the customer 21 similarly to the first example embodiment, further specifies the past purchase history of the customer based on the purchase history database 16, and also specifies a type indicating a customer's taste based on the specified purchase history.

Specifically, the specifying unit 12 first specifies identification information of the customer 21 based on a video image, and acquires purchase history associated with the specified identification information. For example, assume that the store 60 is a sporting-goods store, and the purchase history is purchase history of sporting-goods. In this case, the specifying unit 12 selects a type that matches the customer 21 from among types that have been set in advance, such as "runner" "golfer", "camper", "swimmer", and "skier", based on the acquired purchase history.

In this second example embodiment, the information acquisition unit 13 executes a search using the type selected by the specifying unit 12 as a query in addition to the specified product and attributes of the customer. Specifically, the information acquisition unit 13 executes a search using, as queries, text indicating the identification information of the specified product (name, model number, shape, color, etc.), text indicating the attributes of the customer, and text indicating the type of the customer 21.

As a result, content that is searched for according to this second example embodiment is content corresponding to a product that a customer is interested in and the attributes of the customer to a larger degree, and thus the store salesperson 31 can have a livelier conversation with the customer 21.

[Apparatus Operations]

Next, operations of the customer service assistance apparatus 70 according to this second example embodiment will be described with reference to FIG. 8. FIG. 8 is a flowchart illustrating operations of the customer service assistance apparatus according to the second example embodiment of the invention. In the following description. FIG. 7 will be referred to as appropriate. In addition, in this second example embodiment, the customer service assistance method is implemented by causing the customer service assistance apparatus 70 to operate. Therefore, description of the customer service assistance method according to this second example embodiment is replaced with the following description of operations of the customer service assistance apparatus 70.

Figure 8:
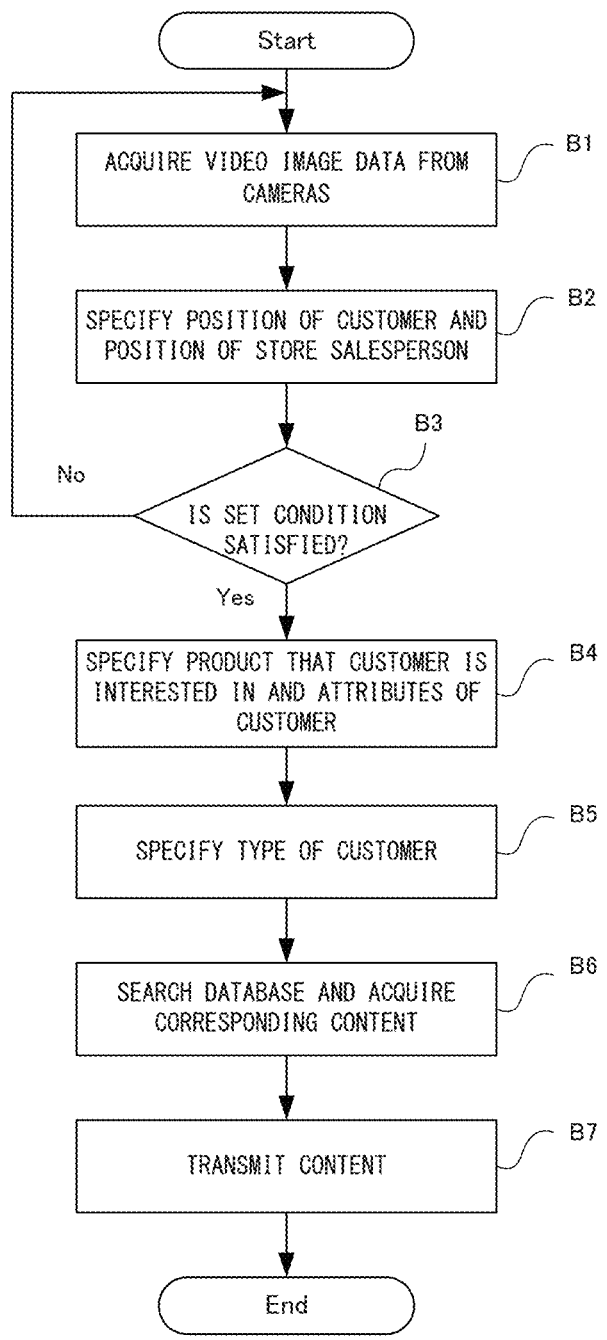
FIG. 8 is a flowchart illustrating operations of the customer service assistance apparatus according to the second example embodiment of the invention.

As illustrated in FIG. 8, first, the video image acquisition unit 11 acquires a video image from each of the cameras 20 (step B1). Step B1 is similar to step A1 illustrated in FIG. 6.

Next, the position specifying unit 15 specifies the position of the customer 21 and the position of the store salesperson 31 that are located inside the store 60 (step B2). Step B2 is similar to step A2 illustrated in FIG. 6.

Next, the specifying unit 12 determines whether or not the relationship between the position of the customer 21 and the position of the store salesperson 31 specified in step A2 satisfies a set condition (step B3). Step B3 is similar to step A3 illustrated in FIG. 6.

As a result of the determination in step B3, if the set condition is not satisfied, step B1 is executed again by the video image acquisition unit 11. On the other hand, as a result of the determination of step B3, if the set condition is satisfied, the specifying unit 12 specifies a product that the customer 21 located in the store 60 is interested in and attributes of the customer 21 (step B4). Step B4 is similar to step A4 illustrated in FIG. 6.

Next, the specifying unit 12 further specifies a past purchase history of the customer from the purchase history database 16, and specifies a type indicating a customer's taste based on the specified purchase history (step B5). Specifically, in step B5, the specifying unit 12 selects a type that matches the customer 21 from among types that have been set in advance, based on the purchase history.

Next, the information acquisition unit 13 searches a specific database using, as queries, the product and attributes specified in step B4 and the type specified in step B5, and thereby acquires content corresponding to the product, attributes and type that serve as queries (step B6).

Next, the transmission unit 14 transmits the content acquired in step B6 to the terminal apparatus 30 of the store salesperson 31 (step B7). Accordingly, in this second example embodiment as well, as illustrated in FIGS. 4 and 5, the store salesperson 31 can check the content on the screen of the terminal apparatus 30, and can have a conversation with the customer based on this content.

Effects of Second Example Embodiment

As described above, also in this second example embodiment, similarly to the first example embodiment, the store salesperson 31 can have a lively conversation with a customer based on content displayed on the screen of the terminal apparatus 30, and thus can easily motivate the customer to purchase a product. In particular, also in this second example embodiment, it is possible to help a customer who cannot decide whether or not to purchase a product that the customer is interested into make up their mind. In addition, in this second example embodiment, content is searched for using the type of a customer as a query as well, and thus it is possible to more reliably help the customer to makeup their mind. Furthermore, also in this second example embodiment, content is automatically transmitted to the terminal apparatus 30 of the store salesperson 31 according to the positional relation between the store salesperson 31 and the customer 21, and thus the store salesperson can efficiently serve the customer.

[Program]

A program according to this second example embodiment may be any program that causes a computer to execute steps B1 to B7 illustrated in FIG. 8. The customer service assistance apparatus 70 and the customer service assistance method according to this second example embodiment can be realized by installing this program to a computer, and executing the program. In this case, a processor of the computer functions as the video image acquisition unit 11, the specifying unit 12, the information acquisition unit 13, the transmission unit 14, and the position specifying unit 15, and performs processing.

In addition, the program according to this second example embodiment may also be executed by a computer system constituted by a plurality of computers. In this case, for example, each of the computers may function as one of the video image acquisition unit 11, the specifying unit 12, the information acquisition unit 13, the transmission unit 14, and the position specifying unit 15.

(Physical Configuration)

Figure 9:
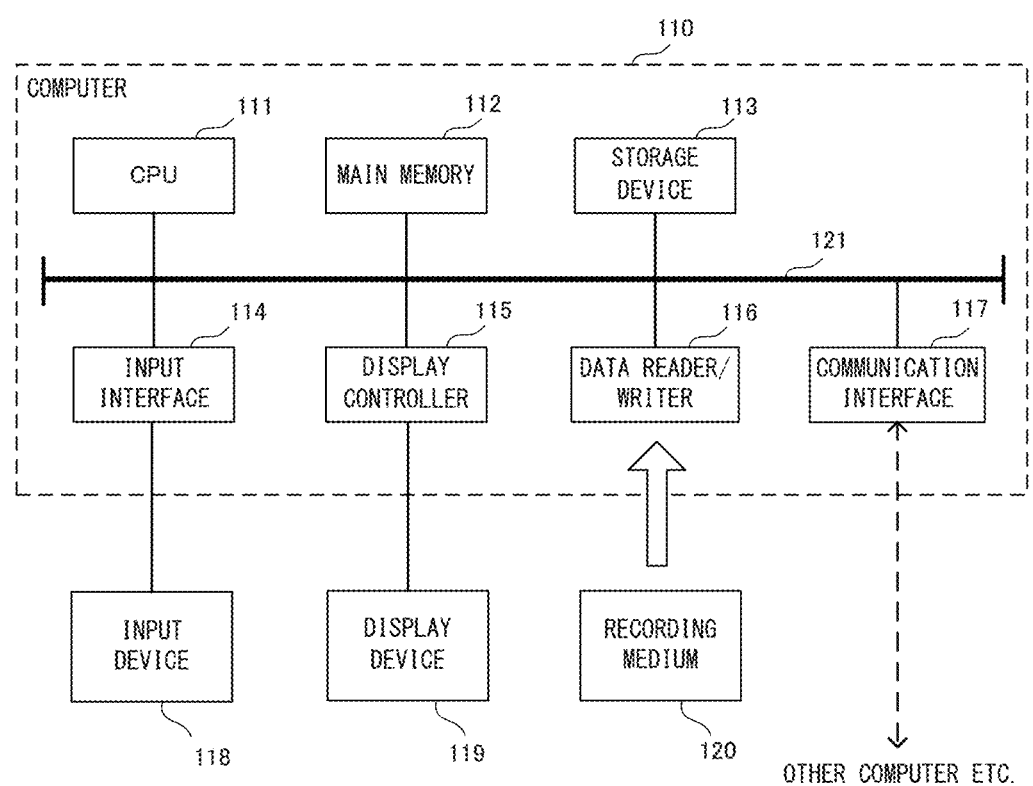
FIG. 9 is a block diagram illustrating an example of a computer that realizes the customer service assistance apparatus according to the first or second example embodiment of the invention.

Here, a computer that realizes the customer service assistance apparatus by executing the programs in the first and second example embodiments will be described with reference to FIG. 9. FIG. 9 is a block diagram illustrating an example of a computer that realizes the customer service assistance apparatuses in the first and second example embodiments of the invention.

As illustrated in FIG. 9, a computer 110 is provided with a CPU (Central Processing Unit) 111, a main memory 112, a storage device 113, an input interface 114, a display controller 115, a data reader/writer 116, and a communication interface 117. These units are connected via a bus 121 to enable mutual data communication. Note that the computer 110 may also be provided with a GPU (Graphics Processing Unit) or an FPGA (Field-Programmable Gate Array) in addition to the CPU 111, or in place of the CPU 111.

The CPU 111 carries out various calculations by deploying programs (codes) according to the present example embodiment stored in the storage device 113 to the main memory 112, and executing these in a predetermined order. The main memory 112 is typically a volatile storage device such as a DRAM (Dynamic Random Access Memory). In addition, the programs in the present example embodiment are provided in a state of being stored in a computer-readable recording medium 120. Note that the programs in the present example embodiment may also be programs distributed on the Internet connected via the communication interface 117.

In addition, specific examples of the storage device 113 include a semiconductor storage device such as a flash memory, in addition to a hard disk drive. The input interface 114 mediates data transmission between the CPU 111 and at input device 118 such as a keyboard or a mouse. The display controller 115 is connected to a display device 119, and controls display on the display device 119.

The data reader/writer 116 mediates data transmission between the CPU 111 and the recording medium 120, reads out a program from the recording medium 120, and writes a processing result from the computer 110 to the recording medium 120. The communication interface 117 mediates data transmission between the CPU 111 and another computer.

In addition, specific examples of the recording medium 120 include general-purpose semiconductor storage devices such as a CF (Compact Flash (registered trademark)) and an SD (Secure Digital), magnetic recording media such as a flexible disk, and optical recording media such as a CD-ROM (Compact Disk Read Only Memory).

Note that the customer service assistance apparatuses according to the first and second example embodiments can also be realized by using hardware items corresponding to the units instead of a computer in which the programs are installed. Furthermore, a configuration may also be adopted in which a portion of the customer service assistance apparatus is realized by a program, and the remaining portion is realized by hardware.

A portion or the entirety of the above example embodiments can be expressed as Supplementary notes 1 to 12 to be described below, but there is no limitation to the following description.

(Supplementary Note 1)

A customer service assistance apparatus comprising:

a video image acquisition unit configured to acquire a video image of the inside of a store.

a specifying unit configured to specify a product that a customer in the store is interested in and an attribute of the customer, based on the acquired video image:

an information acquisition unit configured to execute a search using the specified product and attribute as queries, and acquire content corresponding to the product and attribute that serve as the queries; and a transmission unit configured to transmit the acquired content to a terminal apparatus that is used by a store salesperson of the store.

(Supplementary Note 2)

The customer service assistance apparatus according to Supplementary Note 1, wherein the information acquisition unit selects a database according to the attribute, and searches the selected database, (Supplementary Note 3)

The customer service assistance apparatus according to Supplementary Note 1 or 2, wherein the specifying unit specifies past purchase history of the customer, and also specifies a type indicating a taste of the customer based on die specified purchase history, and the information acquisition unit executes a search also using the specified type as one of the queries.

(Supplementary Note 4)

The customer service assistance apparatus according to any one of Supplementary Note 1 to 3, further comprising a position specifying unit configured to specify a position of the store salesperson of the store based on positional information for specifying a position of a terminal apparatus that is used by the store salesperson, and also specify a position of the customer based on the acquired video image, wherein, if a relationship between the position of the customer and the position of the store salesperson satisfies a set condition, the specifying unit specifies a product that the customer is interested in and the attribute of the customer.

(Supplementary Note 5)

A customer service assistance method comprising:

(a) a step of acquiring a video image of the inside of a store;

(b) a step of specifying a product that a customer in the store is interested in and an attribute of the customer, based on the acquired video image;

(c) a step of executing a search using the specified product and attribute as queries, and acquiring content corresponding to the product and attribute that serve as the queries; and (d) a step of transmitting the acquired content to a terminal apparatus that is used by a store salesperson of the store.

(Supplementary Note 6)

The customer service assistance method according to Supplementary Note 5, wherein, in the (c) step, a database is selected according to the attribute, and the selected database is searched, (Supplementary Note 7)

The customer service assistance method according to Supplementary Note 5 or 6, wherein, in the (b) step, past purchase history of the customer is specified, and a type indicating a taste of the customer is also specified based on the specified purchase history, and in the (c) step, a search is executed also using the specified type as one of the queries.

(Supplementary Note 8)

The customer service assistance method according to any one of Supplementary Notes 5 to 7, further comprising:

(e) a step of specifying a position of the store salesperson of the store based on positional information for specifying a position of a terminal apparatus that is used by the store salesperson, and also specifying a position of the customer based on the acquired video image, wherein, in the (b) step, if a relationship between the position of the customer and the position of the store salesperson satisfies a set condition, a product that the customer is interested in and the attribute of the customer are specified.

(Supplementary Note 9)

A computer-readable recording medium that includes a program recorded thereon, the program including instructions that cause a computer to carry out:

(a) a step of acquiring a video image of the inside of a store;

(b) a step of specifying a product that a customer in the store is interested in and an attribute of the customer, based on the acquired video image:

(c) a step of executing a search using the specified product and attribute as queries, and acquiring content corresponding to the product and attribute that serve as the queries; and (d) a step of transmitting the acquired content to a terminal apparatus that is used by a store salesperson of the store.

(Supplementary Note 10)

The computer-readable recording medium according to Supplementary Note 9, wherein, in the (c) step, a database is selected according to the attribute, and the selected database is searched.

(Supplementary Note 11)

The computer-readable recording medium according to Supplementary Note 9 or 10, wherein, in the (b) step, past purchase history of the customer is specified, and a type indicating a taste of the customer is also specified based on the specified purchase history, and in the (c) step, a search is executed also using the specified type as one of the queries.

(Supplementary Note 12)

The computer-readable recording medium according to any one of Supplementary Notes 9 to 11, the program further including an instruction that causes a computer to carry out:

(e) a step of specifying a position of the store salesperson of the store based on positional information for specifying a position of a terminal apparatus that is used by the store salesperson, and also specifying a position of the customer based on the acquired video image, wherein, in the (b) step, if a relationship between the position of the customer and the position of the store salesperson satisfies a set condition, a product that the customer is interested in and the attribute of the customer are specified.

Although the present invention has been described above with reference to the example embodiments above, the invention is not limited to the above example embodiments. Various modifications understandable to a person skilled in the art can be made in configurations and details of the invention, within the scope of the invention.

INDUSTRIAL APPLICABILITY

As described above, according to the invention, it is possible to suggest a customer service action that a store salesperson needs to take in order to motivate a customer to purchase a product. The invention is useful to any application in which a store salesperson needs to serve a customer without particular limitation.

LIST OF REFERENCE SIGNS

10 Customer service assistance apparatus (first example embodiment)
11 Video image acquisition unit
12 Specifying unit
13 Information acquisition unit
14 Transmission unit
15 Position specifying unit
16 Purchase history database
20 Camera
21 Customer
22 Moving path
30 Terminal apparatus
31 Salesperson
40 LAN
41 Wireless access port
42 Internet
50 Database
60 Store
70 Customer service assistance apparatus (second example embodiment)
110 Computer
111 CPU
112 Main memory
113 Storage apparatus
114 Input interface
115 Display controller
116 Data reader/writer
117 Communication interface
118 Input device
119 Display device
120 Recording medium
121 Bus

The invention claimed is:
1. A customer service assistance apparatus comprising:
a memory storing one or more instructions; and
a processor configured to execute the one or more instructions to implement:
  acquire a video image of the inside of a store;
  extract features of a customer in the video image and track the customer based on the extracted features;
  detect a store salesperson by comparing the extracted features with stored features corresponding the store salesperson;
  specify a product that the customer in the store is interested in and an attribute of the customer, based on the acquired video image by:
    detecting a face or a hand of the customer in the video image, and
    identifying a product to which the face is directed, or a product that is in contact with the hand as the product that the customer in the store is interested;
  execute a search using the specified product and the specified attribute as queries, and acquire content corresponding to the product and the attribute that serve as the queries;
  transmit the acquired content to a terminal apparatus that is used by the store salesperson of the store; and
  detect a serving state, and until the detected serving state is cancelled, refrain from transmitting new content to the terminal apparatus that is in the serving state,
  wherein the features of the detected image are collated with a table in which a feature is registered for each piece of identification information of the product, and an identification information of the product in which the customer is interested is specified,
  wherein the customer service assistance apparatus is automatically notified of the serving state based on an image obtained by a front camera of the terminal apparatus.
2. The customer service assistance apparatus according to claim 1,
  wherein the processor is further configured to select a database according to the attribute, and searches the selected database.
3. The customer service assistance apparatus according to claim 1,
  wherein the processor is further configured to specify past purchase history of the customer, and specify a type indicating a taste of the customer based on the specified purchase history, and
  the processor is further configured to execute a search also using the specified type as one of the queries.
4. The customer service assistance apparatus according to claim 1, wherein the processor is further configured to:
specify a position of the store salesperson of the store based on positional information for specifying a position of a terminal apparatus that is used by the store salesperson, and specify a position of the customer based on the acquired video image,
  wherein, if a relationship between the position of the customer and the position of the store salesperson satisfies a set condition, the processor is further configured to specify a product that the customer is interested in and the attribute of the customer.
5. A customer service assistance method comprising:
acquiring a video image of the inside of a store;
extracting features of a customer in the video image and track the customer based on the extracted feature;
detecting a store salesperson by comparing the extracted features with stored features corresponding the store salesperson;
  specifying a product that a the customer in the store is interested in and an attribute of the customer, based on the acquired video image by:
    detecting a face or a hand of the customer in the video image, and
    identifying a product to which the face is directed, or a product that is in contact with the hand as the product that the customer in the store is interested;
executing a search using the specified product and the specified attribute as queries, and acquiring content corresponding to the product and the attribute that serve as the queries;
transmitting the acquired content to a terminal apparatus that is used by the store salesperson of the store; and detecting a serving state, and until the detected serving state is cancelled, refraining from transmitting new content to the terminal apparatus that is in the serving state, wherein the features of the detected image are collated with a table in which a feature is registered for each piece of identification information of the product, and an identification information of the product in which the customer is interested is specified, and wherein the terminal apparatus automatically notifies the customer service assistance apparatus of the serving state based on an image obtained by a front camera of the terminal apparatus.

6. The customer service assistance method according to claim 5, wherein, in the executing, a database is selected according to the attribute, and the selected database is searched.

7. The customer service assistance method according to claim 5, wherein, in the specifying the product, past purchase history of the customer is specified, and a type indicating a taste of the customer is also specified based on the specified purchase history, and in the executing, a search is executed also using the specified type as one of the queries.

8. The customer service assistance method according to claim 5, further comprising:

specifying a position of the store salesperson of the store based on positional information for specifying a position of a terminal apparatus that is used by the store salesperson, and also specifying a position of the customer based on the acquired video image, wherein, in the specifying the product, if a relationship between the position of the customer and the position of the store salesperson satisfies a set condition, a product that the customer is interested in and the attribute of the customer are specified.

9. A non-transitory computer-readable recording medium that includes a program recorded thereon, the program including instructions that cause a computer to carry out:

acquiring a video image of the inside of a store;

extracting features of a customer in the video image and track the customer based on the extracted features;

detecting a store salesperson by comparing the extracted features with stored features corresponding the store salesperson;

specifying a product that a the customer in the store is interested in and an attribute of the customer, based on the acquired video image by:

detecting a face or a hand of the customer in the video image, and identifying a product to which the face is directed, or a product that is in contact with the hand as the product that the customer in the store is interested;

executing a search using the specified product and the specified attribute as queries, and acquiring content corresponding to the product and the attribute that serve as the queries;

transmitting the acquired content to a terminal apparatus that is used by the store salesperson of the store; and detecting a serving state, and until the detected serving state is cancelled, refraining from transmitting new content to the terminal apparatus that is in the serving state, wherein the features of the detected image are collated with a table in which a feature is registered for each piece of identification information of the product, and an identification information of the product in which the customer is interested is specified, and wherein the terminal apparatus automatically notifies the customer service assistance apparatus of the serving state based on an image obtained by a front camera of the terminal apparatus.

10. The non-transitory computer-readable recording medium according to claim 9, wherein, in the executing, a database is selected according to the attribute, and the selected database is searched.

11. The non-transitory computer-readable recording medium according to claim 9, wherein, in the specifying the product, past purchase history of the customer is specified, and a type indicating a taste of the customer is also specified based on the specified purchase history, and in the executing, a search is executed also using the specified type as one of the queries.

12. The non-transitory computer-readable recording medium according to claim 9, the program further including an instruction that causes a computer to carry out:

specifying a position of the store salesperson of the store based on positional information for specifying a position of a terminal apparatus that is used by the store salesperson, and also specifying a position of the customer based on the acquired video image, wherein, in the specifying the product, if a relationship between the position of the customer and the position of the store salesperson satisfies a set condition, a product that the customer is interested in and the attribute of the customer are specified.

\* \* \* \* \*